United States Patent
Takahashi (10) Patent No.: US 10,356,010 B2
(45) Date of Patent: Jul. 16, 2019

(54) CONTROL DEVICE

(71) Applicant: Kabushiki Kaisha Toshiba, Minato-ku, Tokyo (JP)

(72) Inventor: Shinji Takahashi, Kokubunji Toyko (JP)

(73) Assignee: Kabushiki Kaisha Toshiba, Tokyo (JP)

(*) Notice: Subject to any disclaimer, the term of this patent is extended or adjusted under 35 U.S.C. 154(b) by 107 days.

(21) Appl. No.: 15/527,309

(22) PCT Filed: Oct. 14, 2015

(86) PCT No.: PCT/JP2015/079063
§ 371 (c)(1),
(2) Date: May 16, 2017

(87) PCT Pub. No.: WO2016/080112
PCT Pub. Date: May 26, 2016

(65) Prior Publication Data
US 2018/0309698 A1    Oct. 25, 2018

(30) Foreign Application Priority Data
Nov. 18, 2014   (JP) .................................. 2014-234036

(51) Int. Cl.
*H04L 12/939*     (2013.01)
*H04L 12/42*      (2006.01)
(Continued)

(52) U.S. Cl.
CPC ............ *H04L 49/555* (2013.01); *H04L 12/28* (2013.01); *H04L 12/42* (2013.01); *H04L 41/08* (2013.01); *H04L 41/145* (2013.01)

(58) Field of Classification Search
CPC ......... H04L 12/40; H04L 12/42; H04L 12/46; H04L 12/185; H04L 12/417;
(Continued)

(56) References Cited

U.S. PATENT DOCUMENTS 8,001,306 B2 *  8/2011  Beckhoff .............. H04L 12/437
                                                      709/251
8,040,814 B2   10/2011  Takatori
(Continued)

FOREIGN PATENT DOCUMENTS

JP   2000-115203 A    4/2000
JP   2008-131132 A    6/2008
(Continued)

OTHER PUBLICATIONS

International Search Report and Written Opinion mailed by Japan Patent Office dated Jan. 12, 2016 in the corresponding PCT application No. PCT/JP2015/079063.

*Primary Examiner* — Michael Thier
*Assistant Examiner* — Prince A Mensah
(74) *Attorney, Agent, or Firm* — Knobbe, Martens, Olson & Bear, LLP (57) ABSTRACT

According to one embodiment, a control device is for controlling a plurality of nodes configuring a dual ring network. Each of the nodes includes: a communicator configured to be capable of transmitting/receiving a frame to/from an adjacent node; a first counter configured to perform counting up when a normal frame is received via the communicator; and a second counter configured to perform counting up when an abnormal frame is received via the communicator. The control device includes a controller configured: to identify, when an abnormal frame is transmitted/received in the dual ring network, a terminal node of the dual ring network from the nodes based on values of the first counter and the second counter of each of the nodes; and to identify an abnormal part in the dual ring network based on the value of the second counter by using the identified terminal node as a starting point.

6 Claims, 10 Drawing Sheets

(51) Int. Cl.
*H04L 12/28* (2006.01)
*H04L 12/24* (2006.01)

(58) Field of Classification Search
CPC ... H04L 12/427; H04L 12/433; H04L 12/437; H04L 47/10; H04L 12/28; H04L 41/08; H04L 41/145; H04L 49/555
See application file for complete search history.

(56) References Cited

U.S. PATENT DOCUMENTS

| | | |
|---|---|---|
| 8,411,559 B2 | 4/2013 | Kono et al. |
| 8,705,343 B2 | 4/2014 | Kono et al. |
| 9,100,211 B2 | 8/2015 | Kono et al. |
| 2007/0230366 A1* | 10/2007 | Takatori ................ H04L 12/185 370/254 |
| 2010/0002705 A1 | 1/2010 | Takatori |
| 2012/0290692 A1* | 11/2012 | Reich .................... H04L 12/437 709/220 |
| 2013/0114400 A1 | 5/2013 | Zhang et al. |

FOREIGN PATENT DOCUMENTS

| | | |
|---|---|---|
| JP | 2013-098977 A | 5/2013 |
| JP | 2014-078871 A | 5/2014 |
| WO | WO 2008/114364 A1 | 9/2008 |

\* cited by examiner

FIG.11

CONTROL DEVICE

CROSS-REFERENCE TO RELATED APPLICATIONS

This application is national stage application of International Application No. PCT/JP2015/079063, filed Oct. 14, 2015, which designates the United States, incorporated herein by reference, and which is based upon and claims the benefit of priority from Japanese Patent Application No. 2014-234036, filed Nov. 18, 2014, the entire contents of which are incorporated herein by reference.

FIELD

Embodiments described herein relate generally to a control device.

BACKGROUND

Conventionally, there has been known a ring network called dual ring network.

Conventionally, it has been difficult to identify an abnormal part when an abnormality occurs in the dual ring network.

DETAILED DESCRIPTION

In general, according to one embodiment, a control device is for controlling a plurality of nodes configuring a dual ring network. Each of the nodes includes: a communicator configured to be capable of transmitting/receiving a frame to/from an adjacent node; a first counter configured to perform counting up when a normal frame is received via the communicator; and a second counter configured to perform counting up when an abnormal frame is received via the communicator. The control device includes a controller configured: to identify, when an abnormal frame is transmitted/received in the dual ring network, a terminal node of the dual ring network from the nodes based on values of the first counter and the second counter of each of the nodes; and to identify an abnormal part in the dual ring network based on the value of the second counter by using the identified terminal node as a starting point.

Hereinafter, an embodiment will be described with reference to the drawings.

First, a network configuration of a communication system 1000 according to the embodiment will be described with reference to FIG. 1.

Figure 1:
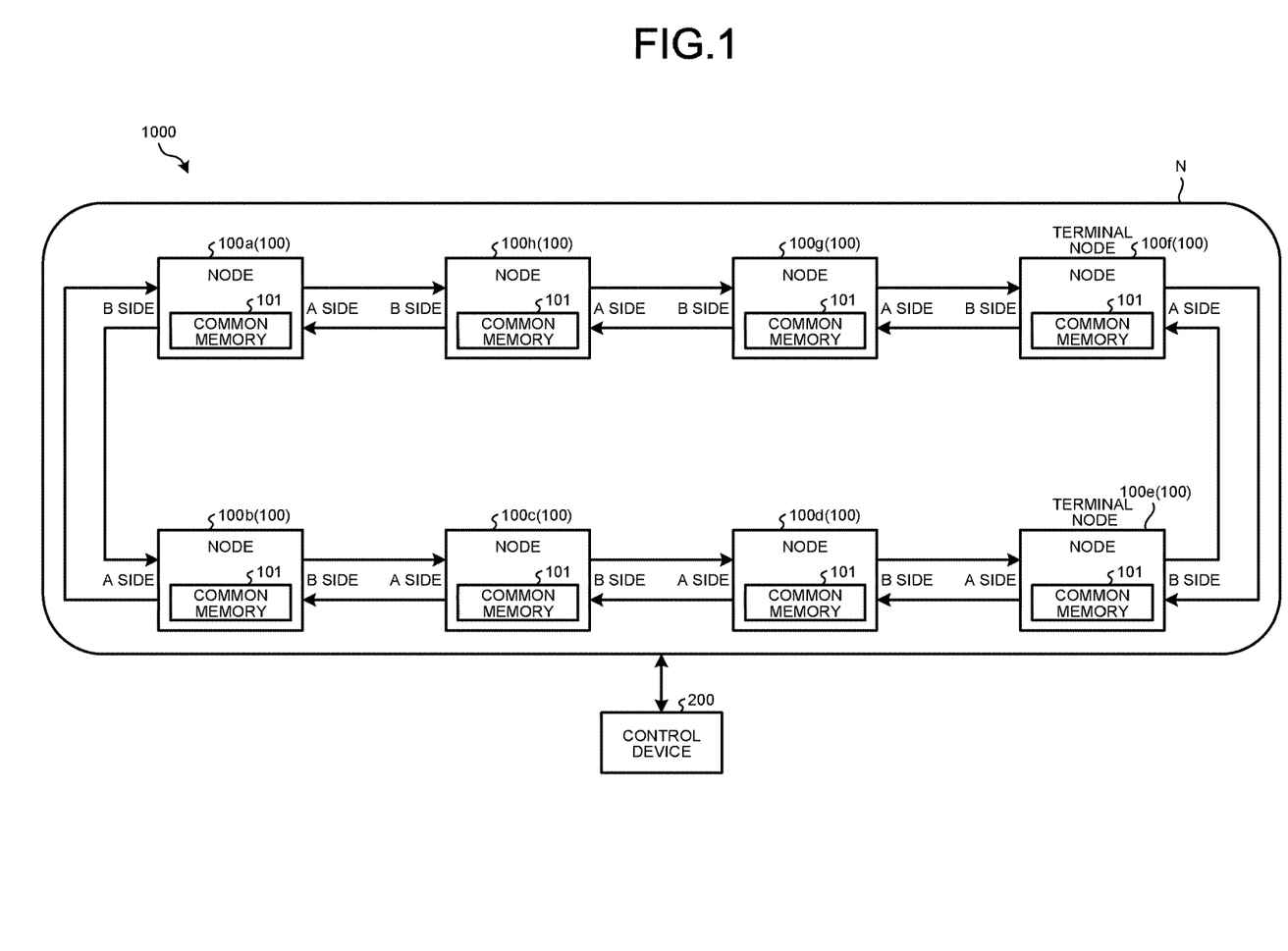
FIG. 1 is an exemplary block diagram illustrating a network configuration of a communication system according to an embodiment.

As illustrated in FIG. 1, the communication system 1000 according to the embodiment includes a plurality of nodes 100 (eight nodes 100a to 100h) constituting a network N and a control device 200 for controlling the plurality of nodes 100. Each of the nodes 100 is configured to be capable of performing communication in two directions, i.e., on an A side and a B side. Further, each node 100 includes a common memory 101.

The network N according to the embodiment is a dual ring network configured by connecting the plurality of nodes 100 communicable in two directions in a ring shape. In other words, as illustrated in FIG. 1, each node 100 according to the embodiment is configured to be capable of transmitting (relaying) a frame received from the node 100 adjacent to the A side to the node 100 adjacent to the B side, and transmitting (relaying) a frame received from the node 100 adjacent to the B side to the node 100 adjacent to the A side. With this configuration, the nodes 100 can maintain the same content in the respective common memories 101 and share data stored on the common memories 101. Note that FIG. 1 illustrates an example where the number of the nodes 100 are eight. However, in the embodiment, the number of nodes 100 may be seven or less or nine or more as long as the nodes can constitute the dual ring network.

Herein, in the network N serving as the dual ring network, two nodes 100 of the plurality of nodes 100 are set as terminal nodes. Those terminal nodes are provided to be adjacent to each other. One terminal node is configured not to relay a frame received from the other terminal node to the node 100 adjacent to a side opposite to the side of the other terminal node, and the other terminal node does not relay a frame received from the one terminal node to the node 100 adjacent to a side opposite to the side of the one terminal node. Providing such terminal nodes in the dual ring network prevents a frame from being continuously circulated in the network. In FIG. 1, as an example, the nodes 100e and 100f are set as terminal nodes.

An internal configuration of the node 100 will be described more specifically with reference to FIG. 2 and FIG. 3.

Figure 2:
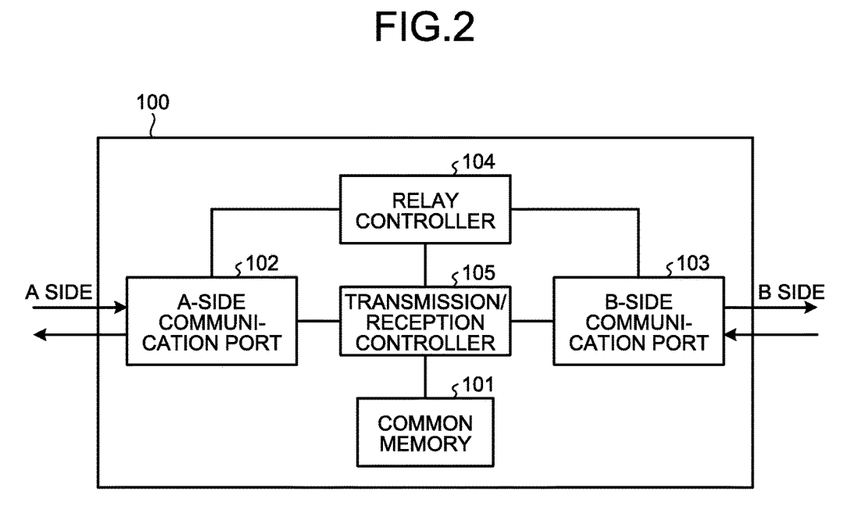
FIG. 2 is an exemplary block diagram illustrating an internal configuration of a node according to the embodiment.

As illustrated in FIG. 2, the node 100 includes the common memory 101, an A-side communication port 102, a B-side communication port 103, a relay controller 104, and a transmission/reception controller 105.

The A-side communication port 102 is a communication port for transmitting/receiving a frame to/from the node 100 adjacent to the A side. The B-side communication port 103 is a communication port for transmitting/receiving a frame to/from the node 100 adjacent to the B side. The relay controller 104 is a controller that can control the A-side communication port 102, the B-side communication port 103, and the transmission/reception controller 105 so as to prevent, in a case where the node 100 is set as one of the two terminal nodes, the node 100 from relaying a frame to the other terminal node.

The transmission/reception controller 105 is a controller for controlling transmission/reception of a frame via the A-side communication port 102 and the B-side communication port 103. Specifically, the transmission/reception controller 105 is configured to be capable of transmitting data (frame) in the common memory 101 via the A-side communication port 102 and the B-side communication port 103 and store, on the common memory 101, data (frame) received via the A-side communication port 102 and the B-side communication port 103. The transmission/reception controller 105 has an internal configuration illustrated in FIG. 3.

Figure 3:
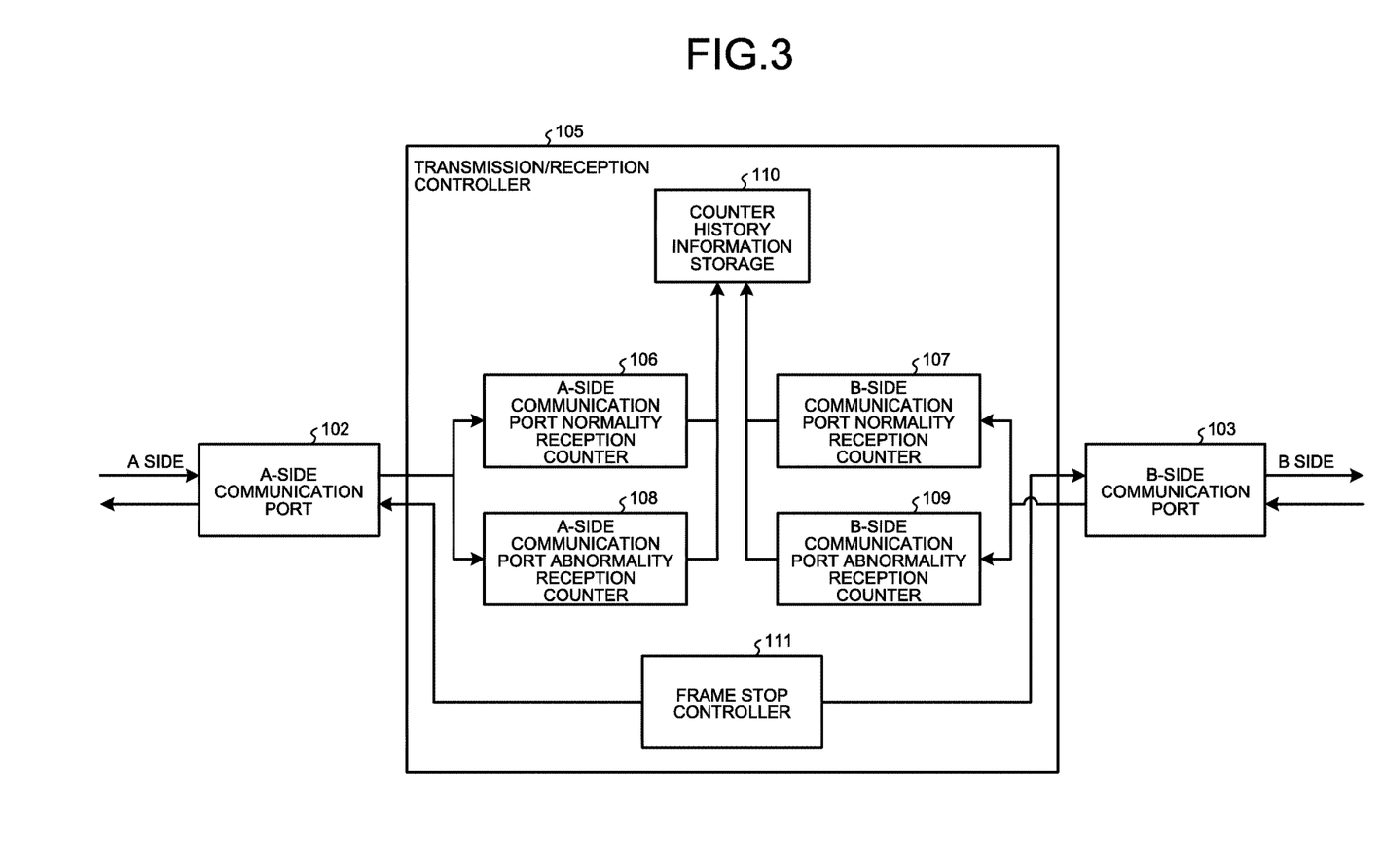
FIG. 3 is an exemplary block diagram illustrating an internal configuration of a transmission/reception controller of a node according to the embodiment.

As illustrated in FIG. 3, the transmission/reception controller 105 includes an A-side communication port normality reception counter 106, a B-side communication port normality reception counter 107, an A-side communication port abnormality reception counter 108, a B-side communication port abnormality reception counter 109, a counter history information storage 110, and a frame stop controller 111. Hereinafter, for the sake of simplification, the A-side communication port normality reception counter 106 will be referred to as "A-side normality counter 106", and the B-side communication port normality reception counter 107 will be referred to as "B-side normality counter 107". Similarly, the A-side communication port abnormality reception counter 108 will be referred to as "A-side abnormality counter 108", and the B-side communication port abnormality reception counter 109 will be referred to as "B-side abnormality counter 109". Further, the A-side normality counter 106, the B-side normality counter 107, the A-side abnormality counter 108, and the B-side abnormality counter 109 will be generally referred to as "counters 106 to 109".

The A-side normality counter 106 is configured to perform counting up in a case where a normal frame is received via the A-side communication port 102. That is, the A-side normality counter 106 is configured to count the number of normal frames received from the node 100 adjacent to the A side. Similarly, the B-side normality counter 107 is configured to perform counting up in a case where a normal frame is received via the B-side communication port 103. That is, the B-side normality counter 107 is configured to count the number of normal frames received from the node 100 adjacent to the B side.

Meanwhile, the A-side abnormality counter 108 is configured to perform counting up in a case where an abnormal frame is received via the A-side communication port 102. That is, the A-side abnormality counter 108 is configured to count the number of abnormal frames received from the node 100 adjacent to the A side. Similarly, the B-side abnormality counter 109 is configured to perform counting up in a case where an abnormal frame is received via the B-side communication port 103. That is, the B-side abnormality counter 109 is configured to count the number of abnormal frames received from the node 100 adjacent to the B side.

The counter history information storage 110 is configured to accumulate values of the respective counters 106 to 109 together with time as counter history information. The frame stop controller 111 is configured to be capable of controlling the A-side communication port 102 so as to stop transmission of a frame to the node 100 adjacent to the A side and control the B-side communication port 103 so as to stop transmission of a frame to the node 100 adjacent to the B side.

A hardware configuration of the control device 200 will be described with reference to FIG. 4.

Figure 4:
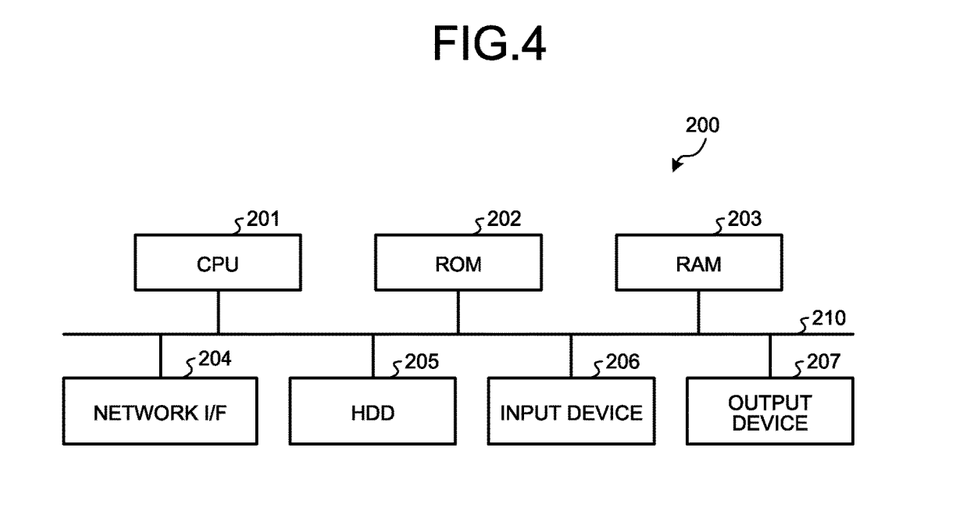
FIG. 4 is an exemplary block diagram illustrating a hardware configuration of a control device according to the embodiment.

As illustrated in FIG. 4, the control device 200 has a hardware configuration using a general computer. That is, the control device 200 includes a CPU (Central Processing Unit) 201, a ROM (Read Only Memory) 202, a RAM (Random Access Memory) 203, a network I/F 204, an HDD (Hard Disk Drive) 205, an input device 206 such as a keyboard and a mouse, and an output device 207 such as a display device. Such hardware is connected to a bus 210.

Herein, in a case where an abnormal frame is transmitted/received in the network N, the CPU 201 of the control device 200 according to the embodiment is configured to be capable of identifying a terminal node from the plurality of nodes 100 on the basis of the values of the counters 106 to 109 of each node 100 and to identify an abnormal part in the network N by using the identified terminal node as a starting point on the basis of the values of the A-side abnormality counter 108 and the B-side abnormality counter 109.

Figure 5:
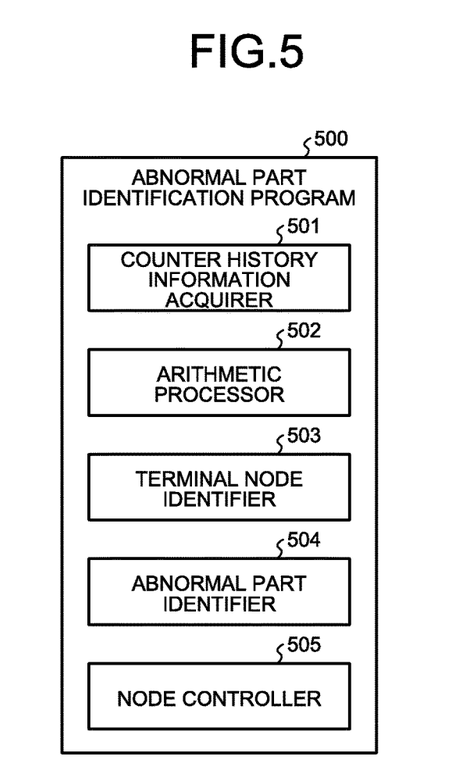
FIG. 5 is an exemplary block diagram illustrating a functional configuration of an abnormal part identification program executed by the control device according to the embodiment.

Specifically, the CPU 201 of the control device 200 according to the embodiment is configured to be capable of identifying an abnormal part in the network N by executing an abnormal part identification program 500 illustrated in FIG. 5. The abnormal part identification program 500 has a module configuration described below.

As illustrated in FIG. 5, the abnormal part identification program 500 includes, as a functional configuration, a counter history information acquirer 501, an arithmetic processor 502, a terminal node identifier 503, an abnormal part identifier 504, and a node controller 505. Those modules are generated in the RAM 203 in such a manner that the CPU 201 of the control device 200 reads the abnormal part identification program 500 from the ROM 202 and executes the abnormal part identification program 500.

The counter history information acquirer 501 has a function of acquiring counter history information from the counter history information storage 110 of each node 100 in the network N. The arithmetic processor 502 has a function of performing various kinds of arithmetic processing and determination processing. The terminal node identifier 503 has a function of identifying a terminal node from the plurality of nodes 100 in the network N. The abnormal part identifier 504 has a function of identifying an abnormal part in the network N. The node controller 505 has a function of controlling each node 100 in the network N.

Figure 6:
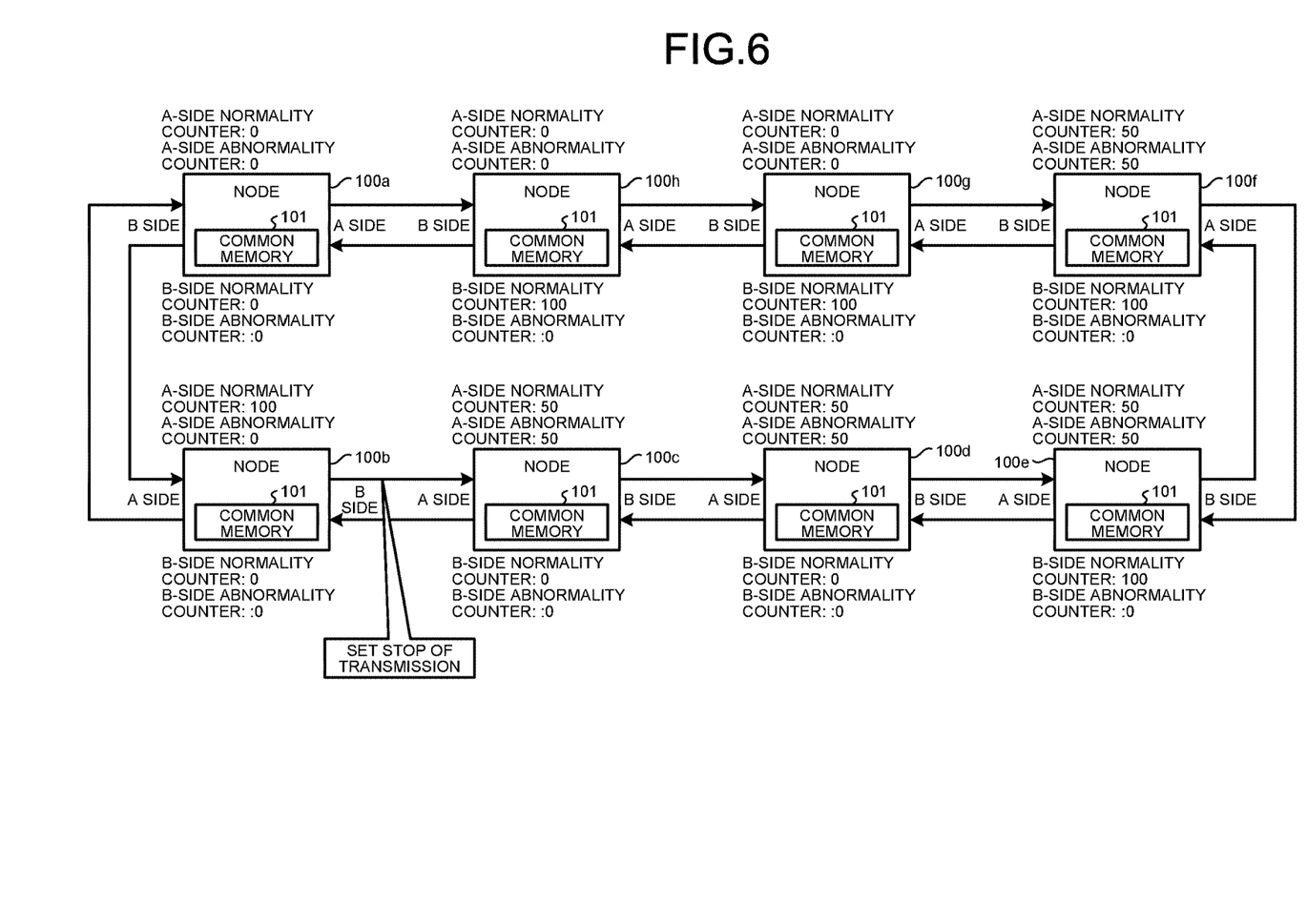
FIG. 6 is an exemplary diagram for explaining an example of a procedure in which the control device according to the embodiment estimates an abnormal part.
Figure 7:
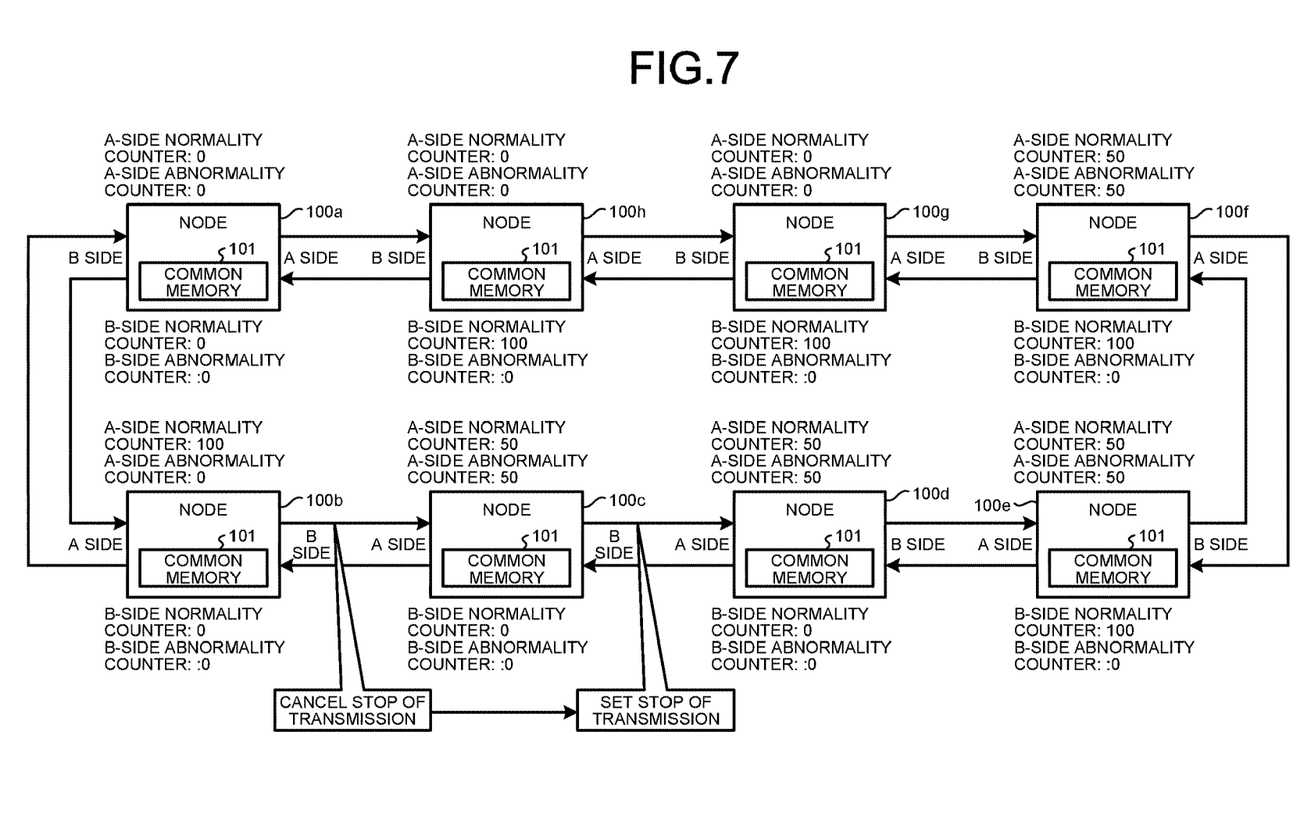
FIG. 7 is an exemplary diagram for explaining another example of the procedure in which the control device according to the embodiment estimates an abnormal part.

Hereinafter, processing for identifying a terminal node in the network N and processing for identifying an abnormal part in the network N will be described in detail with reference to FIG. 6 to FIG. 11. Note that FIG. 6 and FIG. 7 are example diagrams illustrating an example of increments in values of the counters 106 to 109 of each node 100, the increments being obtained in a case where the node 100*a* serving as a base node transmits a frame to the A side and the B side.

First, the processing for identifying a terminal node in the network N will be described. The CPU 201 according to the embodiment is configured to execute the abnormal part identification program 500 so as to identify a terminal node in the network N on the basis of a processing flow illustrated in FIG. 8. The processing flow in FIG. 8 is regularly executed.

Figure 8:
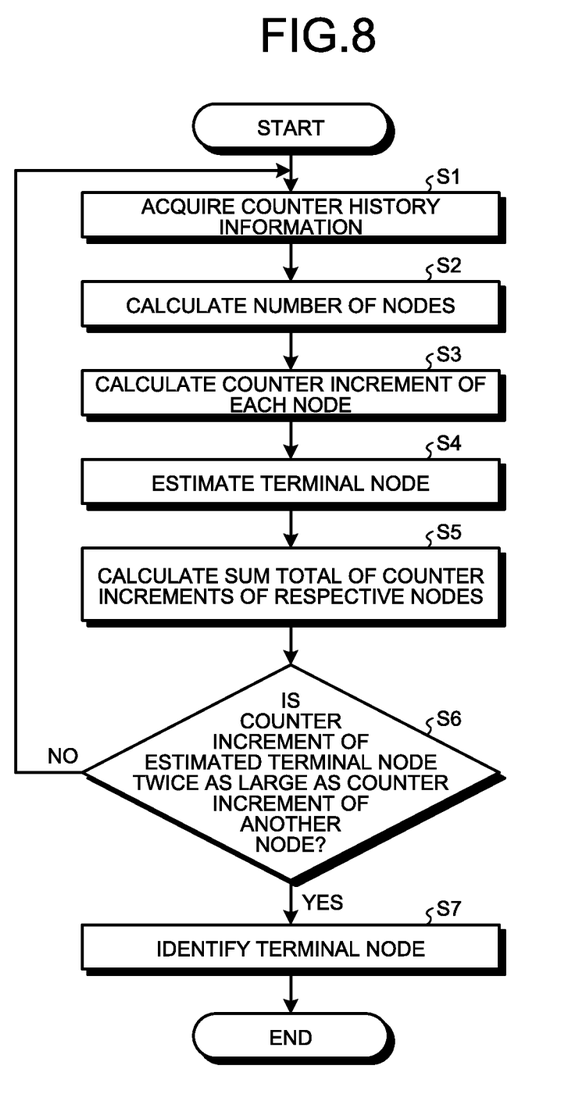
FIG. 8 is an exemplary flowchart for explaining processing executed when the control device according to the embodiment identifies a terminal node.

In the processing flow in FIG. 8, first, in Step S1, the counter history information acquirer 501 acquires counter history information from each node 100 in the network N. Then, the processing proceeds to Step S2.

Then, in Step S2, the arithmetic processor 502 calculates the number of nodes in the network N, i.e., the number of nodes 100 constituting the network N. Specifically, the arithmetic processor 502 calculates the number of nodes 100 from which the counter history information has been acquired, in Step S1, as the number of nodes in the network N. In the examples illustrated in FIG. 6 and FIG. 7, the number of nodes in the network N is eight. Then, the processing proceeds to Step S3.

In Step S3, the arithmetic processor 502 calculates increments in values of the counters 106 to 109 of each node 100 per unit time (hereinafter, referred to as "counter increment"). In the examples illustrated in FIG. 6 and FIG. 7, the counter increment of the node 100a is 0, the counter increments of the nodes 100b to 100d, 100g, and 100h are 100, and the counter increments of the nodes 100e and 100f are 200. Then, the processing proceeds to Step S4.

In Step S4, the terminal node identifier 503 estimates a terminal node in the network N on the basis of the counter increments calculated in Step S3. Specifically, the terminal node identifier 503 estimates, as the terminal node, two nodes 100 having the largest counter increments among all the nodes 100 in the network N. In the examples in FIG. 6 and FIG. 7, the counter increments of the nodes 100e and 100f are the largest, and therefore the terminal node identifier 503 estimates the nodes 100e and 100f as the terminal nodes. Then, the processing proceeds to Step S5.

In Step S5, the arithmetic processor 502 calculates a sum total of the counter increments of each node 100 calculated in Step S3. Herein, a frame transmitted in the network N serving as the dual ring network is finally collected to the terminal nodes, and therefore the counter increment of each terminal node is twice as large as the counter increment of each node 100 other than the terminal nodes. Therefore, assuming that, for example, the number of nodes in the network N is n and the counter increment of each node other than the terminal nodes is M, a sum total of the counter increments of the respective nodes can be calculated by adding a sum total of counter increments of the nodes other than the terminal nodes, which is M×(n−2), to a sum total of the counter increments of the terminal nodes, which is 2M×2. Then, the processing proceeds to Step S6.

In Step S6, the arithmetic processor 502 determines whether or not the counter increment of each terminal node estimated, in Step S4, is twice as large as the counter increment of each of the other nodes 100. With this determination, it is possible to verify whether the estimation result is right or wrong. Note that the processing in Step S6 is desirably performed in a state in which an average value of the sum total of the counter increments calculated in Step S5 does not vary.

In a case where it is determined, in Step S6, that the estimated counter increment of each terminal node is not twice as large as the counter increment of each of the other nodes 100, the processing returns to Step S1. On the contrary, in a case where it is determined, in Step S6, that the estimated counter increment of each terminal node is twice as large as the counter increment of each of the other nodes 100, the processing proceeds to Step S7.

In Step S7, the terminal node identifier 503 identifies the terminal nodes in the network N on the basis of a determination result in Step S6. In the examples in FIG. 6 and FIG. 7, the counter increment of each of the nodes 100e and 100f estimated to be the terminal nodes, in Step S4, is twice as large as the counter increment of each of the nodes 100b to 100d, 100g, and 100h other than the node 100a serving as the base node, and therefore the terminal node identifier 503 identifies the nodes 100e and 100f as the terminal nodes. Then, the processing is terminated.

In this way, the terminal node identifier 503 according to the embodiment estimates terminal nodes and then identifies the terminal nodes on the basis of an estimation result, and therefore it is possible to accurately identify the terminal nodes.

Next, the processing for identifying an abnormal part in the network N will be described. The CPU 201 according to the embodiment is configured to execute the abnormal part identification program 500 so as to identify terminal nodes in the network N on the basis of the processing flow in FIG. 8 and then estimate an abnormal part in the network N on the basis of a processing flow in FIG. 9.

Figure 9:
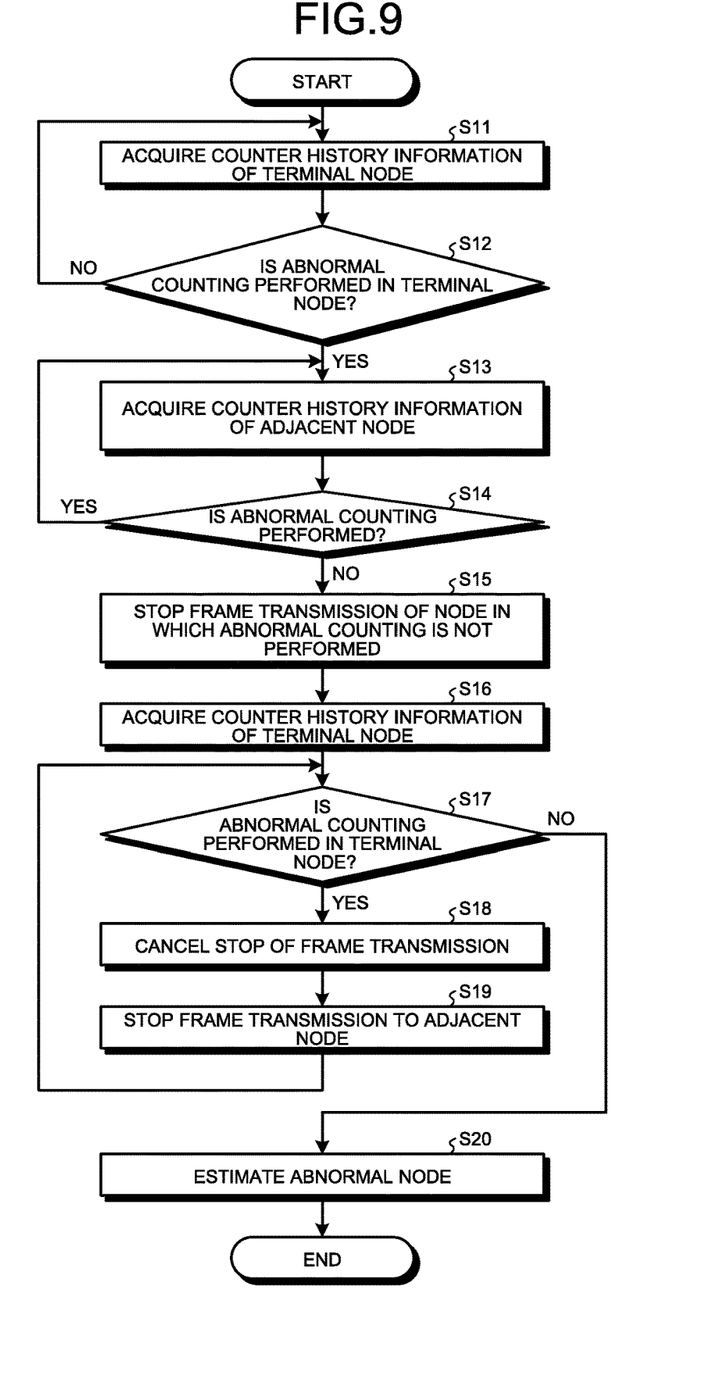
FIG. 9 is an exemplary flowchart for explaining processing executed when the control device according to the embodiment estimates an abnormal part.

In the processing flow in FIG. 9, in Step S11, the counter history information acquirer 501 acquires counter history information of the terminal nodes identified on the basis of the processing flow in FIG. 8. Then, the processing proceeds to Step S12.

In Step S12, the arithmetic processor 502 determines whether or not abnormal counting is performed in each terminal node, i.e., whether or not the A-side abnormality counter 108 and the B-side abnormality counter 109 of the terminal node perform counting up on the basis of the counter history information acquired in Step S11.

In a case where it is determined, in Step S12 that abnormal counting is not performed, the processing returns to Step S11. On the contrary, in a case where it is determined, in Step S12, that abnormal counting is performed, the processing proceeds to Step S13. In the examples in FIG. 6 and FIG. 7, the A-side abnormality counters 108 of the nodes 100e and 100f identified as the terminal nodes perform counting up.

In Step S13, the counter history information acquirer 501 acquires counter history information of the node 100 adjacent to the node 100 in which presence/absence of abnormal counting has been previously determined. Then, in Step S14, the arithmetic processor 502 determines whether or not abnormal counting is performed in the node 100 serving as an acquisition source from which the counter history information is acquired in Step S13. In a case where it is determined, in Step S14, that abnormal counting is performed, the processing returns to Step S13. In a case where it is determined, in Step S14, that abnormal counting is not performed, the processing proceeds to Step S15.

Herein, the processing in Steps S13 and S14 is processing for sequentially verifying presence/absence of abnormal counting of each node 100 in the network N by using the terminal node as the starting point along a transmission path on a side that causes abnormal counting of the terminal node. Therefore, the processing in Steps S13 and S14 is repeatedly performed until the node 100 in which abnormal counting is not performed is verified.

In the examples in FIG. 6 and FIG. 7, the A-side abnormality counter 108 of the terminal node performs counting up, and therefore presence/absence of abnormal counting of the nodes 100d, 100c, . . . adjacent to the terminal node on the A side is sequentially verified. In the examples in FIG. 6 and FIG. 7, abnormal counting is not performed in the node 100b, and therefore repetition of the processing in Steps S13 and S14 is terminated at a point of time at which presence/absence of abnormal counting of the node 100b is verified. Then, the processing proceeds to Step S15.

In Step S15, the node controller 505 stops transmission of a frame to the node 100 in which presence/absence of abnormal counting has been determined immediately before the node 100 in which it is verified that abnormal counting is not performed. In the examples in FIG. 6 and FIG. 7, the node controller 505 controls the frame stop controller 111 of the node 100b in which abnormal counting is not performed, thereby stopping transmission of a frame from the node 100b, in which abnormal counting is not performed, to the node 100c in which abnormal counting is performed. Then, the processing proceeds to Step S16.

In Step S16, the counter history information acquirer 501 acquires counter history information of the terminal node. Then, in Step S17, the arithmetic processor 502 determines whether or not abnormal counting is performed in the terminal node on the basis of the counter history information acquired in Step S16.

In a case where it is determined, in Step S17, that abnormal counting is performed in the terminal node, the processing proceeds to Step S18. Then, in Step S18, the node controller 505 cancels the stop of the transmission of the frame which has been previously performed. Then, in Step S19, the node controller 505 stops transmission of the frame to the node 100 adjacent to the node 100 in which the stop has been cancelled. Then, the processing returns to Step S17.

Herein, the processing in Steps S17 to S19 is processing for estimating which node 100 between the node 100, in which abnormal counting is not performed, and the terminal node is abnormal.

For example, in the examples in FIG. 6 and FIG. 7, in a case where transmission of the frame from the node 100b to the node 100c is stopped (see FIG. 6) and accordingly abnormal counting of the terminal node is eliminated, it is possible to estimate that the node 100b or 100c is abnormal. More specifically, it is possible to estimate that at least one of the B-side communication port 103 of the node 100b and the A-side communication port 102 of the node 100c is abnormal.

On the contrary, in the examples in FIG. 6 and FIG. 7, in a case where abnormal counting of the terminal node is not eliminated even when transmission of the frame from the node 100b to the node 100c is stopped, it is possible to estimate that there is another abnormal node 100 in addition to the node 100c or 100b. In this case, when transmission of the frame from each node 100 between the node 100c and the terminal node to the terminal node side is sequentially stopped until it is verified that abnormal counting of the terminal node is eliminated, it is possible to further estimate the abnormal node 100.

In other words, in the examples in FIG. 6 and FIG. 7, in a case where abnormal counting of the terminal node is not eliminated even when transmission of the frame from the node 100b to the node 100c is stopped, the stop of the transmission of the frame from the node 100b to the node 100c is cancelled, and it is verified whether or not abnormal counting of the terminal node is performed in a case where transmission of the frame from the node 100c to the node 100d is stopped (see FIG. 7). In a case where abnormal counting of the terminal node is eliminated in this case, it is possible to further estimate that, in addition to the node 100b or 100c, the node 100c or 100d is the abnormal node 100. More specifically, it is possible to estimate that at least one of the B-side communication port 103 of the node 100b and the A-side communication port 102 of the node 100c and at least one of the B-side communication port 103 of the node 100c and the A-side communication port 102 of the node 100d are abnormal. Note that, in a case where abnormal counting of the terminal node is not eliminated even when transmission of the frame from the node 100c to the node 100d is stopped, similar processing may be repeated until abnormal counting of the terminal node is eliminated.

In this way, in the embodiment, the processing in Steps S17 to S19 in FIG. 9 is repeated until it is determined that abnormal counting is not performed in the terminal node in Step S17. Then, in a case where it is determined, in Step S17, that abnormal counting is not performed in the terminal node, the processing proceeds to Step S20. Then, in Step S20, the abnormal part identifier 504 estimates the abnormal node 100 on the basis of the determination result in Step S17. Then, the processing is terminated.

Figure 10:
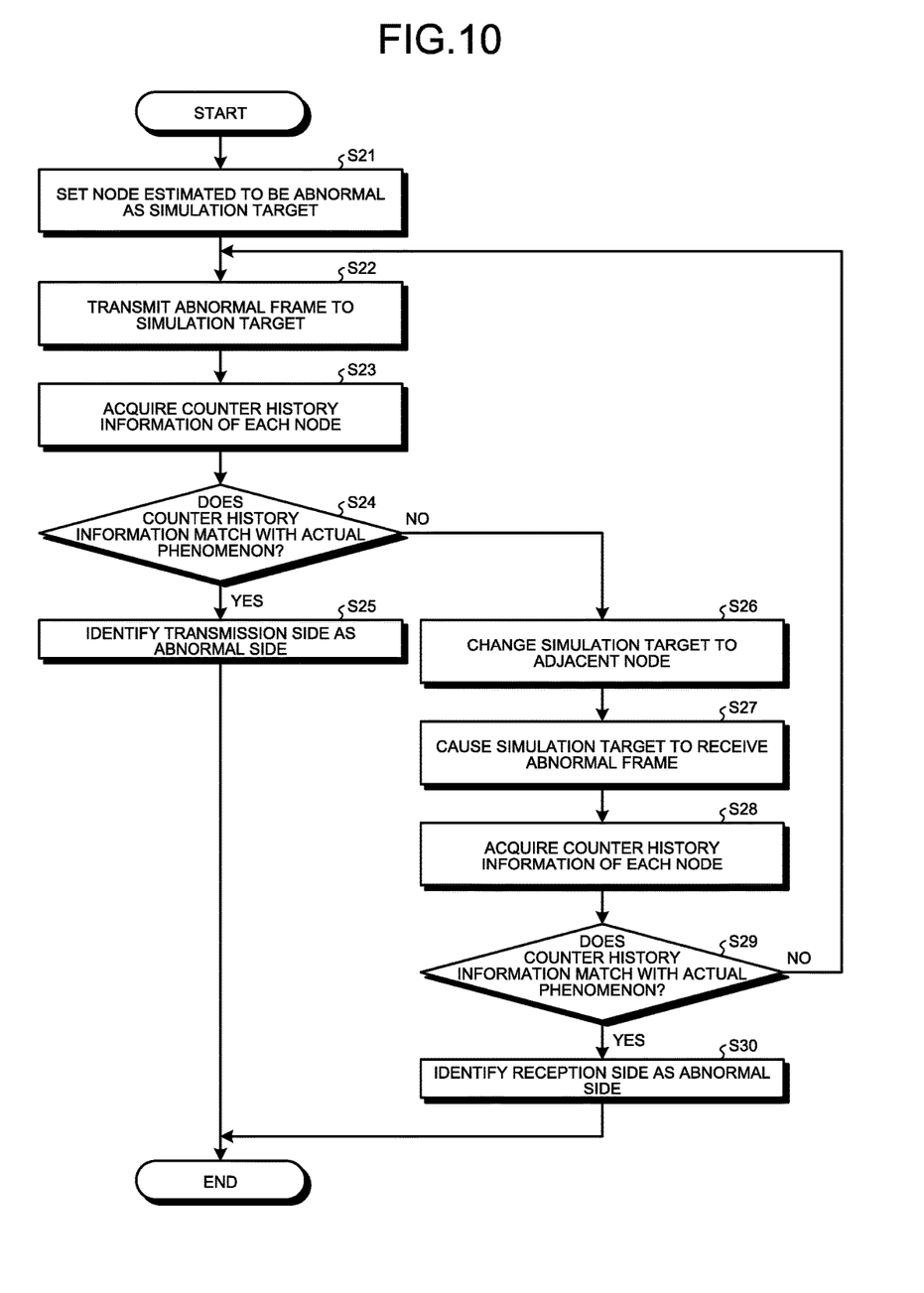
FIG. 10 is an exemplary flowchart for explaining processing executed when the control device according to the embodiment identifies an abnormal part.

The CPU 201 according to the embodiment is configured to execute the abnormal part identification program 500 so as to estimate an abnormal part in the network N on the basis of the processing flow in FIG. 9 and then identify the abnormal part in the network N on the basis of a processing flow in FIG. 10.

In the processing flow in FIG. 10, in Step S21, the abnormal part identifier 504 sets the node 100 estimated to be abnormal as a simulation target on the basis of the processing flow in FIG. 9. The simulation herein is simulation for determining whether an estimation result of the processing flow in FIG. 9 is right or wrong. Then, the processing proceeds to Step S22.

In Step S22, the abnormal part identifier 504 transmits an abnormal frame to the simulation target. The processing in Step S22 is not performed by actually controlling the node 100 with the node controller 505, but is simulatively performed. Then, the processing proceeds to Step S23.

In Step S23, the counter history information acquirer 501 acquires counter history information of each node 100. Then, the processing proceeds to Step S24.

In Step S24, the arithmetic processor 502 determines whether or not the simulative counter history information of each node 100 obtained as a result of the processing in Step S22 matches with an actual phenomenon, i.e., the actual counter history information acquired in Step S23.

In a case where it is determined, in Step S24, that the simulative counter history information matches with the actual counter history information, the processing proceeds to Step S25. Then, in Step S25, the abnormal part identifier 504 identifies a transmission side of the node 100 set as the simulation target as an abnormal side. For example, in the examples in FIG. 6 and FIG. 7, in a case where it is estimated that the node 100b or the node 100c is abnormal and the node 100b is set as the simulation target, in Step S25, the abnormal part identifier 504 identifies, as an abnormal port, the B-side communication port 103 of the node 100b serving as a transmission side in terms of a relationship with the node 100c. Then, the processing is terminated.

On the contrary, in a case where it is determined, in Step S24, that the simulative counter history information does not match with the actual counter history information, the processing proceeds to Step S26. Then, in Step S26, the abnormal part identifier 504 changes the simulation target to the adjacent node 100. For example, in the examples in FIG. 6 and FIG. 7, in a case where the node 100b is set as the current simulation target, the abnormal part identifier 504 changes the simulation target from the node 100b to the node 100c in Step S26. Then, the processing proceeds to Step S27.

In Step S27, the abnormal part identifier 504 causes the simulation target to receive an abnormal frame. This processing in Step S27, as well as the processing in Step S22, is simulatively performed. Then, the processing proceeds to Step S28.

In Step S28, the counter history information acquirer 501 acquires counter history information of each node 100. Then, the processing proceeds to Step S29.

In Step S29, the arithmetic processor 502 determines whether or not the simulative counter history information of each node 100 obtained as a result of the processing in Step S27 matches with an actual phenomenon, i.e., the actual counter history information acquired in Step S28.

In a case where it is determined, in Step S29, that the simulative counter history information does not match with the actual counter history information, the processing returns to Step S22.

On the contrary, in a case where it is determined, in Step S29, that the simulative counter history information matches with the actual counter history information, the processing proceeds to Step S30. Then, in Step S30, the abnormal part identifier 504 identifies a reception side of the node 100 set as the simulation target as an abnormal side. For example, in the examples in FIG. 6 and FIG. 7, in a case where it is estimated, in Step S30, that the node 100b or the node 100c is abnormal and the node 100c is set as the simulation target, the abnormal part identifier 504 identifies, as an abnormal port, the A-side communication port 102 of the node 100c serving as a reception side in terms of a relationship with the node 100b. Then, the processing is terminated.

In this way, the abnormal part identifier 504 according to the embodiment estimates an abnormal part and then identifies the abnormal part on the basis of an estimation result. Therefore, it is possible to accurately identify the abnormal part.

Figure 11:
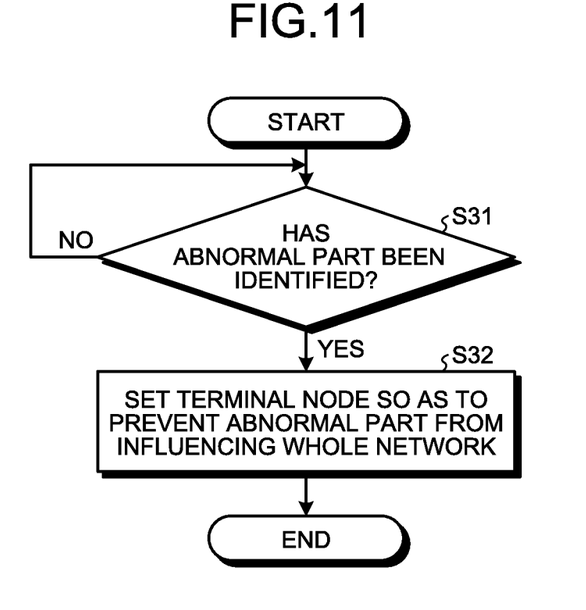
FIG. 11 is an exemplary flowchart for explaining processing executed after the control device according to the embodiment identifies an abnormal part.

Note that the CPU 201 according to the embodiment is configured to execute the abnormal part identification program 500 so as to change a terminal node on the basis of a processing flow in FIG. 11, so that an abnormal part identified on the basis of the processing flow in FIG. 10 is prevented from influencing the whole network N.

In the processing flow in FIG. 11, in Step S31, the arithmetic processor 502 determines whether or not an abnormal part in the network N has been identified. This processing in Step S31 is repeated until it is determined that the abnormal part has been identified. In a case where it is determined, in Step S31, that the abnormal part has been identified, the processing proceeds to Step S32.

In Step S32, the node controller 505 sets a terminal node so as to prevent the identified abnormal part from influencing the whole network N. More specifically, the node controller 505 controls the relay controller 104 of each node 100 so that the node 100 identified as an abnormal node is set as a terminal node.

For example, in the examples in FIG. 6 and FIG. 7, in a case where the B-side communication port 103 of the node 100b is identified as an abnormal part, the node controller 505 sets the nodes 100b and 100c adjacent to each other as terminal nodes in Step S32. With this action, the B-side communication port 103 of the node 100b, which is the abnormal part, is not used for relaying a frame in the network N, and therefore it is possible to prevent the abnormal part from influencing the whole network N. Then, the processing is terminated.

As described above, the CPU 201 of the control device 200 according to the embodiment is configured to execute the abnormal part identification program 500 so as to, in a case where an abnormal frame is transmitted/received in the network N, identify a terminal node from the plurality of nodes 100 on the basis of the values of the counters 106 to 109 of each node 100 and identify an abnormal part in the network N, by using the identified terminal node as a starting point, on the basis of the values of the A-side abnormality counter 108 and the B-side abnormality counter 109. With this configuration, it is possible to easily identify an abnormal part in the network N with automatic processing using the abnormal part identification program 500.

Note that the abnormal part identification program 500 according to the embodiment is provided as a computer program product in an installable format or executable format. That is, the abnormal part identification program 500 is provided in a state in which the abnormal part identification program 500 is contained in a computer program product including a non-transitory computer readable recording medium such as a CD-ROM, a flexible disk (FD), a CD-R, and a DVD (Digital Versatile Disk).

The abnormal part identification program 500 may be provided or distributed via a network, such as the Internet, in a state in which the abnormal part identification program 500 is stored on a computer connected to the network. The abnormal part identification program 500 may also be provided in a state in which the abnormal part identification program 500 is incorporated in a ROM or the like in advance.

Hereinabove, the embodiment of the present invention has been described. However, the above embodiment is merely an example and is not intended to limit the scope of the invention. The above embodiment can be implemented in various forms, and with various kinds of omission, replacement, and modification without departing from the spirit of the invention. The above embodiment falls within the scope and the spirit of the invention, and falls within the scope of the invention recited in claims and equivalents thereof.

What is claimed is:

1. A control device for controlling a plurality of nodes configuring a dual ring network, the control device comprising:
   a processor configured to perform:
   when an abnormal frame is transmitted/received on the dual ring network,
   based on values of a first counter and a second counter in each of the nodes, the first counter counting up when a normal frame is received from an adjacent node, the second counter counting up when an abnormal frame is received from the adjacent node,
   identifying a terminal node of the dual ring network from the nodes; and
   based on a value of the second counter,
   identifying an abnormal part in the dual ring network by using the identified terminal node as a starting point, wherein
   the identifying of the abnormal part is performed in such a manner that:
      the values of the second counters of the nodes are sequentially verified, by using the identified terminal node as the starting point, along a transmission path on a side that causes counting up of the second counter of the terminal node;
      when a first node in which the second counter does not perform counting up is verified, transmission of a frame from the first node to a second node is stopped, the second node being a node in which the value of the second counter has been verified immediately before the first node;
      when it is verified that the second counter of the terminal node does not perform counting up when transmission of the frame from the first node to the second node is stopped, at least one of the first node and the second node is estimated to be abnormal; and whether a result of the estimation is right or wrong is verified.

2. The control device according to claim 1, wherein the processor is configured to perform identifying of the terminal node by:
monitoring the values of the first counter and the second counter of each of the nodes;
estimating a node in which increments in the values of the first counter and the second counter are the largest among the nodes to be the terminal node; and
verifying whether result of the estimation is right or wrong.

3. The control device according to claim 2, wherein the processor is configured to perform identifying of the terminal node by verifying whether or not the increments in the values of the first counter and the second counter of the estimated terminal node are twice as large as the increments in the values of the first counter and the second counter of another node other than the estimated terminal node.

4. The control device according to claim 1, wherein the processor is configured to perform:
cancelling, in a case where it is verified that the second counter of the terminal node performs counting up even when transmission of the frame from the first node to the second node is stopped, the stop of the transmission of the frame from the first node to the second node, and stopping transmission of the frame from the second node to a third node in which the value of the second counter has been verified immediately before the second node;
estimating, in a case where it is verified that the second counter of the terminal node does not perform counting up when transmission of the frame from the second node to the third node is stopped, at least one of the first node and the second node and at least one of the second node and the third node to be abnormal; and
similar processing sequentially, in a case where it is verified that the second counter of the terminal node performs counting up even when transmission of the frame from the second node to the third node is stopped, with respect to each of the nodes along the transmission path until it is verified that the second counter of the terminal node does not perform counting up.

5. The control device according to claim 1, wherein the processor is configured to perform identifying of the abnormal part by verifying whether or not simulative values of the first counter and the second counter match with actual values of the first counter and the second counter, the simulative values being obtained by simulating a case where the node having been estimated to be abnormal is caused to transmit/receive an abnormal frame.

6. The control device according to claim 5, wherein the processor is configured to perform:
identifying a first communicator as the abnormal part when first simulative values of the first counter and the second counter match with the actual values, the first simulative values being obtained by simulating a case where the first communicator of the first node for transmitting a frame to the second node is caused to transmit an abnormal frame; and
verifying whether or not second simulative values of the first counter and the second counter match with the actual values when the first simulative values do not match with the actual values, the second simulative values being obtained by simulating a case where a second communicator of the second node for receiving a frame from the first node is caused to receive the abnormal frame; and
identifying the second communicator as the abnormal part when the second simulative values match with the actual values.

* * * * *